May 20, 1930.  I. C. WELD  1,759,723
CABINET FOR THE RECEPTION OF DAIRY PRODUCTS
Filed Dec. 7, 1927   3 Sheets-Sheet 1
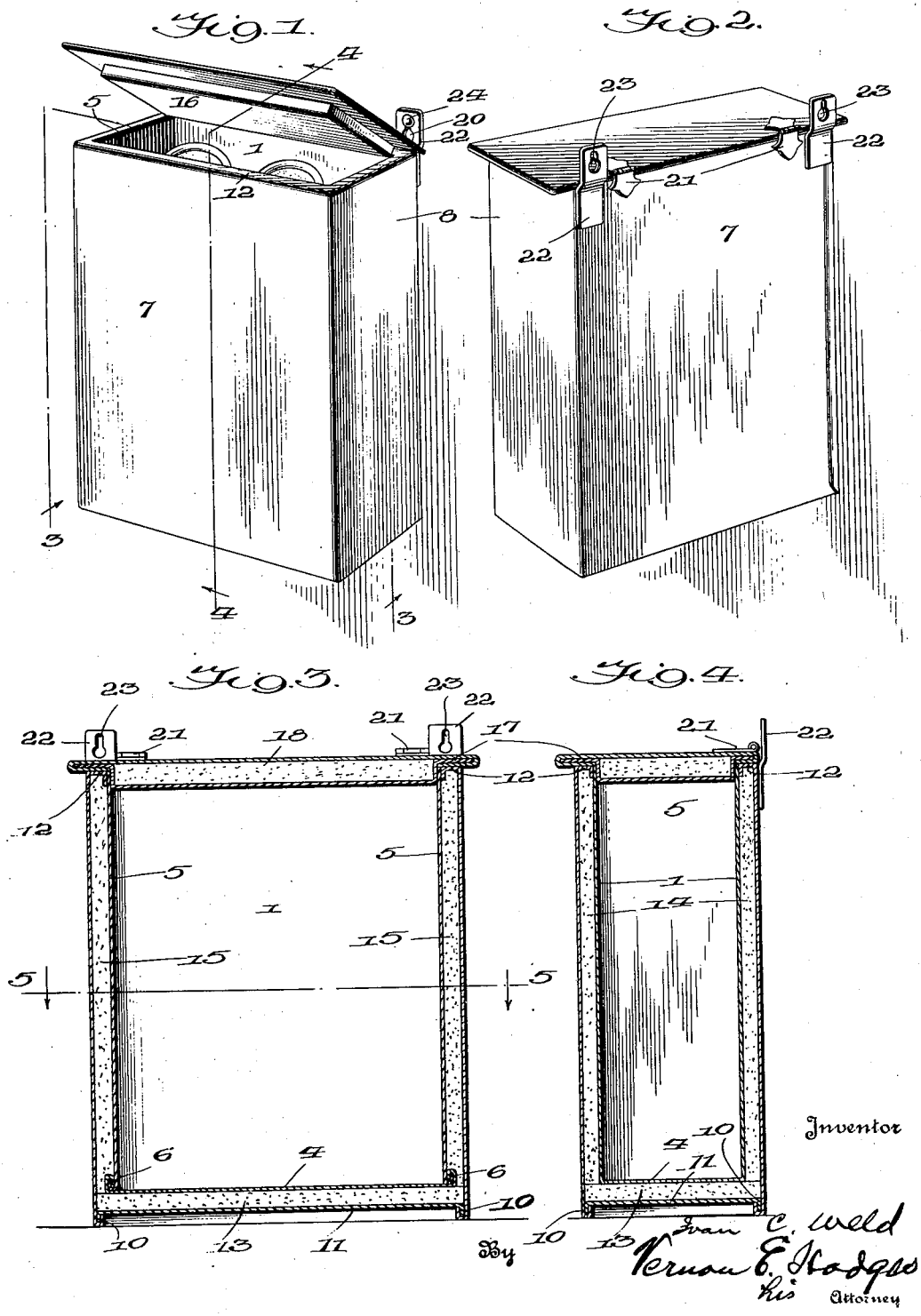

May 20, 1930.　　　　I. C. WELD　　　　1,759,723
CABINET FOR THE RECEPTION OF DAIRY PRODUCTS
Filed Dec. 7, 1927　　3 Sheets-Sheet 2
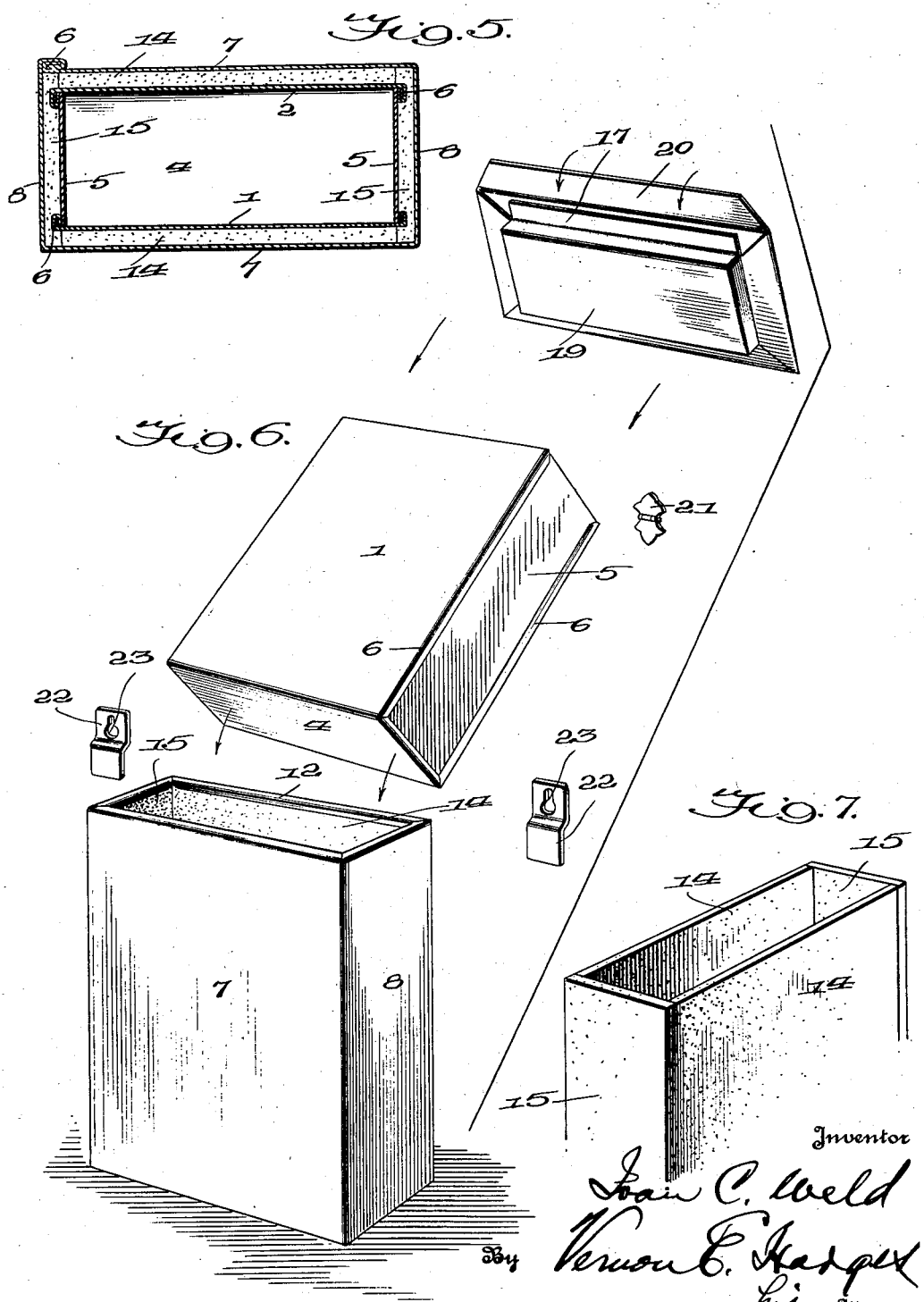

May 20, 1930. I. C. WELD 1,759,723
CABINET FOR THE RECEPTION OF DAIRY PRODUCTS
Filed Dec. 7, 1927 3 Sheets-Sheet 3
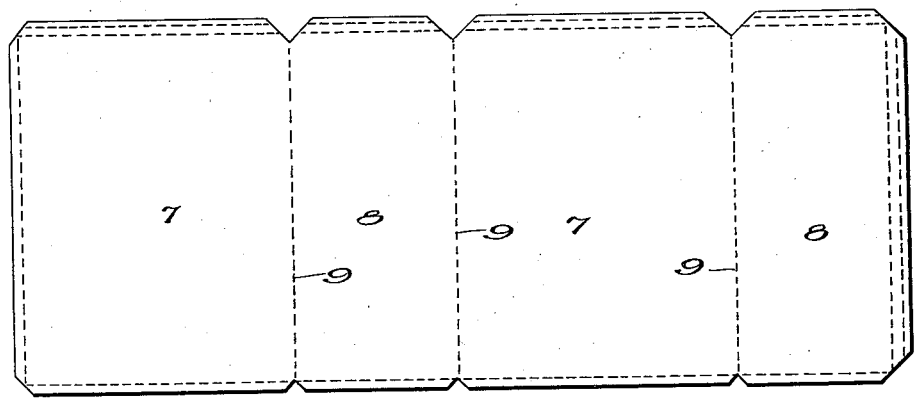
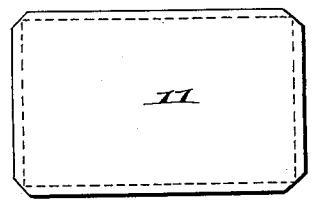
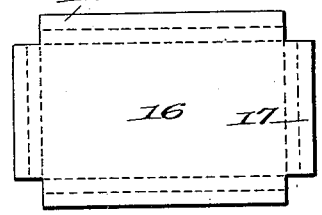
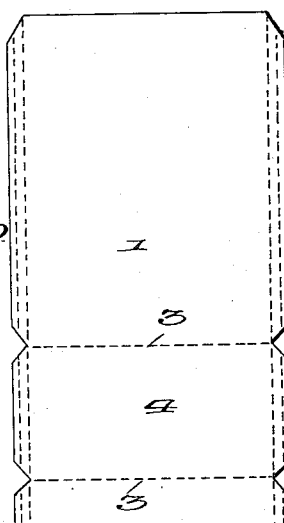
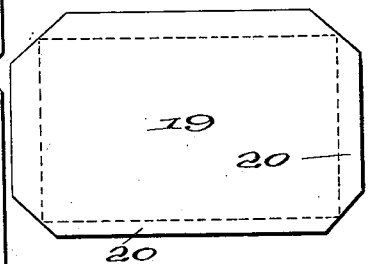
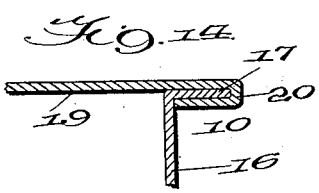
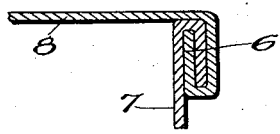
Inventor
Ivan C. Weld
By Vernon E. Hodges
his Attorney Patented May 20, 1930

1,759,723

UNITED STATES PATENT OFFICE

IVAN C. WELD, OF SANDY SPRING, MARYLAND

CABINET FOR THE RECEPTION OF DAIRY PRODUCTS

Application filed December 7, 1927. Serial No. 238,417.

My invention relates to an improvement in cabinets for the reception of dairy products such as milk and cream.

The object is to provide a simple container for the reception preferably of bottles of milk and cream, the intention being not only to keep the milk and cream at a more or less uniform temperature, but also to protect it from the elements and keep it clean and hygienic.

This invention consists of a double-walled receptacle, the space between the double walls being insulated throughout.

In the accompanying drawings:

Fig. 1 is a view in perspective from the front;

Fig. 2 is a similar view from the rear;

Fig. 3 is a section on the line 3—3 of Fig. 1;

Fig. 4 is a section on the line 4—4 of Fig. 1;

Fig. 5 is a horizontal section on the line 5—5 of Fig. 3;

Fig. 6 is a view in perspective of the main elements constituting my improved cabinet;

Fig. 7 is a perpective view of the filler;

Fig. 8 is a view of the blank forming the outside wall;

Fig. 9 is the bottom blank;

Fig. 10 is the inside blank;

Fig. 11 is the end of this blank;

Figs. 12 and 13 are the cover or lid blank;

Fig. 14 is an enlarged sectional view of the joint formed between the blanks of the top; and Fig. 15 is an enlarged view through one of the vertical seams.

The cabinet is made of an inside and outside wall. The blank constituting the inside wall is shown in its preferred form in Figs. 10 and 11, and is composed of the two vertical sides 1 and 2 which are bent upwardly along the dotted lines 3 forming the bottom 4 at the center. One of the two ends 5 is shown in Fig. 11. The seams or joints 6 at the horizontal and vertical edges are shown in Fig. 5, and enlarged in Fig. 15; and the double-dotted lines in Fig. 10 and the single dotted line in Fig. 11 indicate the location and formation of these seams. The intermediate portion of Fig. 6 shows the inner wall or lining complete and ready to enter the outer wall or lining of the receptacle.

The outer wall or lining is preferably made of a single piece of metal cut to form the two integral sides 7 and ends 8, and the blank is bent along the dotted lines 9, and the outer edges brought together and joined and seamed together as shown at 6 in Fig. 5, and the bottom 11 shown in Fig. 9 is preferably fastened in by a seam 10 as shown in Figs. 3 and 4.

An L-shaped flange 12 is formed at the top as shown in Figs. 3, 4 and 6. The insulation of the cabinet proper is preferably formed in five different pieces, one of which 13 is fitted to and covers the bottom of the outer wall as viewed in Figs. 3 and 4, and the pieces 14 between the side walls, and 15 between the end walls, as illustrated in Figs. 3, 4, 5, 6 and 7. These insulating or packing-strips will be called fillers, and they are all inserted and put in place before the inside liner, as shown in Fig. 6, is inserted; and after being thus inserted (as illustrated by the arrows) the upper edges of the inner liner formed from the blank shown in Fig. 10 are soldered securely to the inner edge of the L-shaped flange 12, thus completely enclosing and sealing the fillers and making a perfectly smooth, air-tight, hygienic and sanitary joint at the top of the main receptacle of the cabinet.

The top or lid is formed in similar fashion, the blanks for which are shown in Figs. 12 and 13, the blank 16 having flanges 17 at the four edges which are bent into L-shape as shown in Figs. 3 and 4; and in the receptacle formed in this way a filler 18 of insulating material like the fillers 13, 14 and 15 is inserted; and this blank is joined with the blank 19 shown in Fig. 13, after which the edges 20 are bent around the flanges 17 forming a joint 10, such as shown in Fig. 14.

The top or lid may be fastened by hinges 21 or otherwise, and hangers 22 with keyhole slots 23 may be employed as a means of support upon a nail or screw 24, if desired.

All seams are soldered smooth to prevent accumulation of dirt, and in order to render the cabinet perfectly sanitary.

The fillers of insulating material throughout keep the interior cool and prevent excess of either heat or cold at all times, as well as otherwise protecting the contents from exposure to the elements, thus affording a neat-appearing and thoroughly hygienic receptacle for containing all kinds of dairy products.

I claim:

1. A refrigerator construction comprising an outer shell, a layer of insulating material within said shell, and an inner sheet-metal shell having reinforcing means extending along and strengthening its corners approximately throughout their lengths, said strengthening means reinforcing the corners and maintaining their proper contour while the inner shell is being forced into position, thereby pressing the insulating material into its proper position.

2. A refrigerator construction of the character described comprising an outer shell, a layer of insulating material within said shell, an inner sheet-metal shell having separate ends, reinforcing seams extending along the corners of the inner shell approximately throughout their lengths, and securely joining the ends thereto, said reinforcing seams strengthening the corners and maintaining their proper contour while the inner shell is being forced into position, thereby pressing the insulating material into its proper position, and a closure for the construction.

In testimony whereof I affix my signature.

IVAN C. WELD.